(12) United States Patent
Marlett et al.

(10) Patent No.: US 8,213,982 B2
(45) Date of Patent: Jul. 3, 2012

(54) ENHANCED INTERNAL ANTENNA ARCHITECTURE FOR A MOBILE COMPUTING DEVICE

(75) Inventors: Jeff Marlett, Los Altos, CA (US); Philip Wright, Sunnyvale, CA (US); Guining Shi, San Diego, CA (US); Jerome Tu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 12/476,007

(22) Filed: Jun. 1, 2009

(65) Prior Publication Data

US 2010/0304785 A1 Dec. 2, 2010

(51) Int. Cl.
*H04M 1/00* (2006.01)
(52) U.S. Cl. ............. 455/552.1; 455/78; 455/575.1
(58) Field of Classification Search .......... None
See application file for complete search history.

(56) References Cited

U.S. PATENT DOCUMENTS

| | | | |
|---|---|---|---|
| 7,109,924 B2 * | 9/2006 | Vance | 343/700 MS |
| 7,415,296 B2 * | 8/2008 | Kenoun et al. | 455/575.7 |
| 2001/0030627 A1 * | 10/2001 | Andersson | 343/702 |
| 2005/0059444 A1 * | 3/2005 | Martinez et al. | 455/575.7 |
| 2007/0082622 A1 * | 4/2007 | Leinonen et al. | 455/78 |
| 2008/0064436 A1 * | 3/2008 | Kim | 455/552.1 |
| 2009/0117938 A1 * | 5/2009 | Georgantas et al. | 455/552.1 |
| 2009/0137214 A1 * | 5/2009 | Hofmann et al. | 455/82 |
| 2010/0026589 A1 * | 2/2010 | Dou et al. | 343/702 |
| 2010/0214184 A1 * | 8/2010 | Tran et al. | 343/725 |

* cited by examiner

*Primary Examiner* — Ajit Patel (57) ABSTRACT

Various embodiments of an internal multi-band antenna architecture for a mobile computing device are described. An internal antenna architecture for a mobile computing device may include multiple antenna elements, including a first internal antenna element configured to operate in a downlink frequency sub-band of at least one frequency band for communication in a first mode, and a second internal antenna element configured to operate in an uplink frequency sub-band of the at least one frequency band for communication in the first mode. Other embodiments are described and claimed.

22 Claims, 6 Drawing Sheets

ENHANCED INTERNAL ANTENNA ARCHITECTURE FOR A MOBILE COMPUTING DEVICE

BACKGROUND

A mobile computing device such as a combination handheld computer and mobile telephone or smart phone generally may provide voice and data communications functionality, as well as computing and processing capabilities. For voice and data communications, the mobile computing device typically employs a radio transmitter/receiver ("transceiver") and one or more antennas. Antenna design for a mobile computing device is an important consideration and is often limited by strict performance constraints.

Figure 1A:
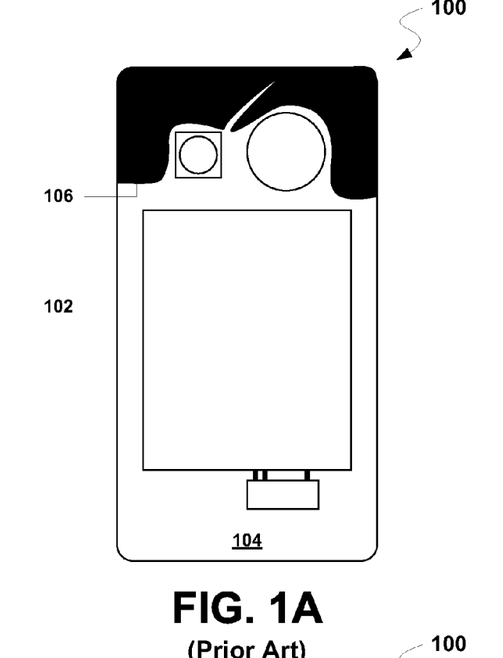
FIG. 1A illustrates a conventional internal antenna design.
Figure 1B:
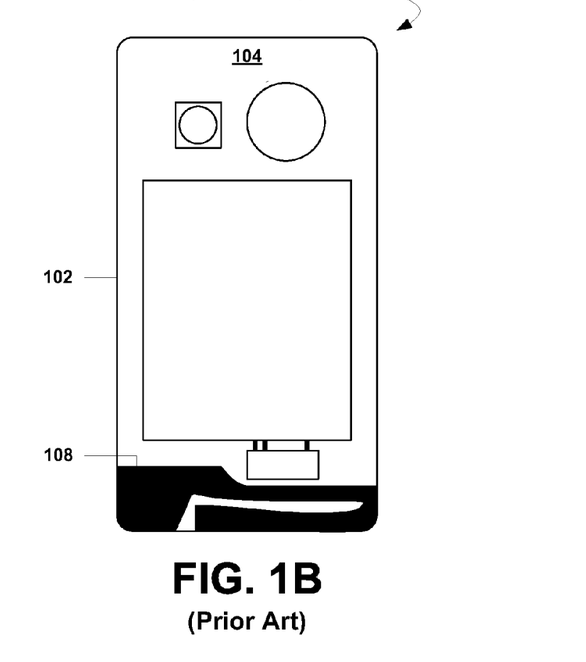
FIG. 1B illustrates a conventional internal antenna design.

FIGS. 1A and 1B illustrate two conventional internal antenna designs for a mobile computing device 100. As shown, the mobile computing device 100 comprises an external housing 102 and a printed circuit board (PCB) 104. FIG. 1A depicts a planar inverted-F antenna (PIFA) type design with an internal antenna 106 positioned on the PCB 104 at the top of the mobile computing device 100. The PIFA type design generally requires a ground layer underneath the internal antenna 106. FIG. 1B depicts a paper-clip antenna type design with an internal antenna 108 positioned on the PCB 104 at the bottom of the mobile computing device 100. The paper-clip type design generally requires removal of the ground layer underneath the internal antenna 108.

Some antenna placements may be undesirable if they increase the overall size and shape of the device. In addition, some antenna placements may provide reduced or unsatisfactory performance. Some antenna placements even may prevent compliance with certain regulatory requirements for device operation, such as the FCC specific absorption rate (SAR) limit of 1.6 mW/g. Such problems may be further exacerbated for mobile computing devices with smaller form factors. Accordingly, there exists the need for improved internal antenna architectures for a mobile computing device.

DETAILED DESCRIPTION

Various embodiments are directed to an internal multi-band antenna architecture for a mobile computing device. In one or more embodiments, a mobile computing device may be implemented as a dual-mode Global System for Mobile Communications/Universal Mobile Telephone System (GSM/UMTS) multi-band device configured to operate in either an 850 MHz frequency band, an 1800 MHz frequency band, a 1900 MHz frequency band, and a 2100 MHz frequency band (850/1800/1900/2100 frequency set) or a 900 MHz frequency band, the 1800 MHz frequency band, the 1900 MHz frequency band, and the 2100 MHz frequency band (900/1800/1900/2100 frequency set). Other sets of frequency bands may be used as well. The internal multi-band antenna architecture may comprise a split multi-band/single sub-band design having internal antenna elements which coexist to cover all four frequency bands with sufficient efficiency and SAR performance.

When employing the conventional antenna designs illustrated in FIGS. 1A and 1B, it may not be feasible to design a single multi-band antenna having sufficient efficiency and performance to cover the 850/1800/1900/2100 MHz frequency bands or the 900/1800/1900/2100 MHz frequency bands. As the number of frequency bands and required bandwidth increase, the design of a single multi-band antenna becomes more difficult. Prior solutions focus on extending functionality of an antenna with longer traces or meander lines, more intricate planar structures, larger physical antenna sizes, and so forth. This becomes untenable for smaller form-factor devices. In particular, antenna size is a key limitation. For example, an antenna may have a height of only 5.9 mm in some devices. Furthermore, regardless of antenna efficiency, the antenna in such small devices often may be too close to the user's head while the user is talking. As a result, the user's head absorbs too much energy radiating from antenna or, stated another way, the SAR value of the device will be too high to comply with the FCC limit of 1.6 mW/g.

Because the conventional internal antenna designs shown in FIGS. 1A and 1B require more space to function properly, they are not suitable as the internal dimensions of the device decrease. With such designs, when there is less space for the antenna, performance suffers significantly. Namely, either the SAR value will be too high to comply with FCC standards or the efficiency will be too low to pass carrier requirements.

For example, if the conventional design (e.g., PIFA) of FIG. 1A is employed, the top-positioned internal antenna may be able to achieve only 36% minimum efficiency across the four operating bands with a SAR of 1.86 mW/g or above, which is higher than FCC limit of 1.6 mW/g. If the conventional design (e.g., paper-clip) of FIG. 1B is employed, the bottom-positioned internal antenna could improve efficiency to 42%, but still cannot obtain 50% minimum efficiency across all four operating bands. In addition, it is difficult to have a SAR value at all four bands of less than 1.6 mW/g. Typically, the SAR value for such design is 2.43 mW/g.

To solve these and other problems, a mobile computing device may comprise an internal multi-band antenna architecture having a split multi-band/single sub-band design. For example, a first internal antenna element may be configured for downlink UMTS operations in the 2100 MHz frequency band. A second internal antenna element may be configured for tri-band GSM operation in the 850 MHz frequency band, the 1800 MHz frequency band, and the 1900 MHz frequency band (850/1800/1900 MHz) or in the 900 MHz frequency band, the 1800 MHz frequency band, and the 1900 MHz frequency band (900/1800/1900 MHz). The second internal antenna element may be further configured for uplink UMTS operations in the 1900 MHz frequency band. In such embodiments, the first internal antenna element and the second internal antenna element may co-exist to cover all four frequency bands with sufficient efficiency and SAR performance. The embodiments, however, are not limited in this context.

Figure 2:
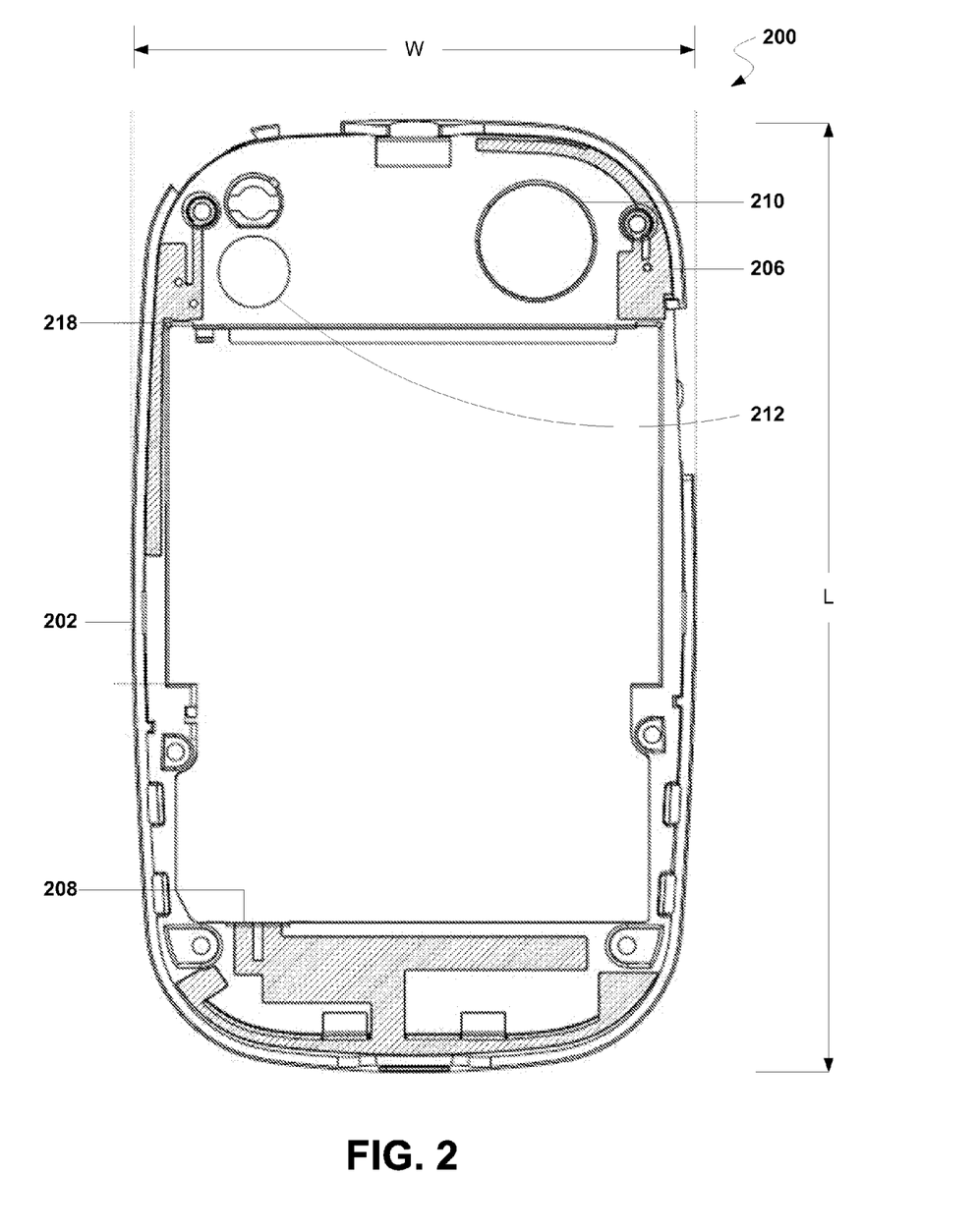
FIG. 2 illustrates one embodiment of an internal antenna design.

FIG. 2 illustrates an internal antenna architecture for a mobile computing device 200. The mobile computing device 200 may comprise a dual-mode GSM/UTMS multi-band device having one or more transceivers and multiple antenna elements to support communications across multiple cellular radiotelephone networks. It may be appreciated that the mobile computing device 200 may comprise any number of transceivers and antenna elements as desired for a given implementation. The embodiments are not limited in this context.

As shown, the mobile computing device 200 may have an internal antenna architecture comprising at least two internal antenna elements 206, 208. In the illustrated embodiment shown in FIG. 2, the mobile computing device 200 may have, among other elements, a housing 202. The housing 202 may have different parts, including an upper portion, a lower portion and a mid-frame (not shown). In one embodiment, a first internal antenna element 206 may be disposed somewhere on the internal surfaces of the various portions of the housing 202. The first internal antenna element 206 may be arranged to operate in at least one downlink frequency sub-band of an upper frequency band from a set of frequency bands for communication in a first mode. A second internal antenna element 208 may also be disposed on the housing 202. The second internal antenna 208 may be arranged to operate in an uplink frequency sub-band of the upper frequency band for communication in the first mode. The second internal antenna element 208 may also be arranged to operate in at least three lower frequency bands from the set of frequency bands for communication in a second mode.

The mobile computing device 200 may comprise, or be implemented as, any type of suitable portable wireless device that is consistent with the described embodiments, such as a smart phone, mobile station, portable computing device with a self-contained power source (e.g., battery), a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communications device, and so forth.

In one embodiment, for example, the mobile computing device 200 may be implemented as a combination handheld computer and mobile telephone, sometimes referred to as a smart phone. Examples of smart phones include various Palm® products such as Palm® Pre™ and Treo™ smart phones, made by Palm Inc., Sunnyvale, Calif. Although some embodiments may be described with the mobile computing device 200 implemented as a smart phone by way of example, it may be appreciated that the embodiments are not limited in this context.

The mobile computing device 200 may implement various communications technologies using, for example, one or more antennas, transceivers, processors and supporting radio architecture. For instance, the mobile computing device 200 may provide voice communications functionality in accordance with different types of cellular systems. Examples of cellular systems may include GSM systems, Code Division Multiple Access (CDMA) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as UMTS, Wideband CDMA (WCDMA), CDMA-2000 and so forth.

In addition to voice communications functionality, the mobile computing device 200 may be arranged to provide wireless wide area network (WWAN) data communications functionality in accordance with different types of cellular systems. Examples of cellular systems offering WWAN data communications services may include Evolution Data Optimized (EVDO) systems, Evolution For Data and Voice (EVDV) systems, CDMA/1xRTT systems, GSM with General Packet Radio Service (GPRS) (GSM/GPRS) systems, Enhanced Data Rates for Global Evolution (EDGE) systems, High Speed Downlink Packet Access (HSDPA) systems, High Speed Uplink Packet Access (HSUPA) systems, and so forth.

The mobile computing device 200 may be arranged to provide data communications functionality in accordance with different types of wireless local area network (WLAN) systems. Examples of suitable WLAN systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 200 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

The mobile computing device 200 may comprise an overall low-profile, small and compact device design. The mobile computing device 200 may also have multiple physical configurations. In one embodiment, for example, the mobile computing device 200 may have an open configuration where a keyboard is exposed, and a closed configuration where the keyboard is hidden. A slider mechanism may allow the mobile computing device 200 to move between the open and closed configurations. A size of the mobile computing device 200 when closed may be approximately 100.53 mm Length (L)×59.57 mm Width (W)×16.95 mm Thickness (T) or smaller. It can be appreciated that designing devices with such small form factors presents major difficulties with respect to the antenna design.

The mobile computing device 200 may have, among other elements, the housing 202. The housing 202 may comprise various materials such as plastic, metal, ceramic, glass, and so forth, suitable for enclosing and protecting the internal components of the mobile computing device. The housing 202 may enclose various internal components of the mobile computing device, including a printed circuited board (PCB) 204. The PCB 204 may comprise materials such as FR4, Rogers R04003, and/or Roger RT/Duroid, for example, and may include one or more conductive traces, via structures, and/or laminates. The PCB 204 also may include a finish such as Gold, Nickel, Tin, or Lead. In various implementations, the PCB 204 may be fabricated using processes such as etching, bonding, drilling, and plating.

The mobile computing device 200 may be implemented with multiple antennas or antenna elements. In general, an antenna (or aerial) is a transducer designed to transmit or receive electromagnetic waves. In other words, antennas convert electromagnetic waves into electrical currents and vice versa. Physically, an antenna is an arrangement of conductors that generate a radiating electromagnetic field in response to an applied alternating voltage and the associated alternating electric current, or can be placed in an electromagnetic field so that the field will induce an alternating current in the antenna and a voltage between its terminals. Examples of antennas may include without limitation a planar inverted-F antenna (PIFA), a paper-clip antenna, a planar inverted-L antenna, an inverted-F antenna with a helical structure, an inverted-L antenna with a helical structure, a folded inverted conformal antenna (FICA), a monopole antenna, a meandered monopole antenna, a dipole antenna, a balanced antenna, a printed helical antenna, a chip antenna, a ceramic antenna, a microstrip antenna, a printed antenna, a patch antenna, a microstrip patch antenna, and any other suitable type of internal antenna which is consistent with the described embodiments.

In one embodiment, for example, the mobile computing device 200 may be implemented with at least two internal antenna elements, including the first internal antenna element 206 and the second internal antenna element 208. Additional antennas or antenna elements may also be implemented for the mobile computing device 200, and the embodiments are not limited in this context.

In various embodiments, the first internal antenna element 206 and/or the second internal antenna element 208 may comprise multiple layers and/or traces formed by chemical etching, metal etching, and other similar techniques. The actual number of layers, and length of each individual layer, may vary for a particular implementation. The antenna traces may have any suitable pattern or geometry tuned for various operating frequencies. For example, the antenna traces may comprise one or more center lines and/or branch lines. Phase lines and/or various chip components, such as resistors, capacitors or inductors, may be used among the center lines and/or branch lines. The different elements may be contacted or parasitic.

In various embodiments, the first internal antenna element 206 and/or the second internal antenna element 208 may comprise a flexible material or substrate. A flexible material may include any pliant material that is capable of being bent or flexed such as a flexible printed circuit (FPC). Other flexible materials may be used, however, such as a wire material, helical material, Teflon material, FR4 material, Mylar material, dielectric substrate, a soft plastic material, and other flexible materials.

In some embodiments, the first internal antenna element 206 and/or the second internal antenna element 208 may comprise a rigid material. A rigid material may include any material that is deficient in or devoid of flexibility. Examples of rigid materials may include metal materials, plastic materials, ceramic materials, and so forth. In some cases, an antenna may be formed using a flat stamped metal having suitable characteristics to match the design and performance constraints for the mobile computing device 200.

In various embodiments, the first internal antenna element 206 and the second internal antenna element 208 may be internal antennas positioned somewhere within the housing 202. As such, all or some of the parts for the antenna elements 206, 208 are not visible to a user. The antenna elements 206, 208 may be positioned in various locations within the housing 202, such as disposed on various inner surfaces of the housing 202, such as an inner surface for an upper portion, a lower portion, or a mid-frame portion. Additionally or alternatively, the antenna elements 206, 208 may be positioned on various components enclosed by the housing 202, such as the PCB 204.

In general, the first internal antenna element 206 may be located substantially near the top of the mobile computing device 200. For example, the first internal antenna element 206 may be located substantially near the top of the housing 202 and/or the top of the PCB 204. The second internal antenna element 208 may be located substantially near the bottom of the mobile computing device 200. For example, the second internal antenna element 208 may be located substantially near the bottom of the housing 202 and/or the bottom of the PCB 204. This placement attempts to maximize distance and space between the antenna elements 206, 208, thereby solving some of the problems associated with co-located antennas within a single device.

The first internal antenna element 206 may be positioned substantially near the top of the housing 202 and/or the top of the PCB 204. The first internal antenna element 206 may be configured to operate in a downlink frequency sub-band of an upper frequency band, such as the 2100 MHz frequency band, for example. Upper frequency bands, in general, require smaller antenna volumes. In some embodiments, the first internal antenna element 206 may be structured and arranged in close proximity to various components of the mobile computing device 200 such as a speaker 210, a camera 212, and/or a battery within the mobile computing device 200. Due to the smaller volume required by the first internal antenna element 206, there is sufficient space on the top of the mobile computing device 200 to implement a high-quality speaker 210, a camera 212, and/or other components.

In various implementations, the first internal antenna element 206 may employ a planar inverted-F antenna (PIFA) type antenna design having a ground layer of the PCB 204 underneath the internal antenna element 206. The ground plane may improve antenna performance and reduce SAR. The ground plane also may be required underneath the first internal antenna element 206 when certain components positioned at the edge of the PCB 204 demand a ground layer underneath for their circuitry. In such implementations, the first internal antenna element 206 may achieve greater than 50% efficiency.

The second internal antenna element 208 may be positioned substantially near the bottom of the housing 202 and/or the bottom of the PCB 204 in order to improve efficiency. In some embodiments, the second internal antenna element 208 may be structured and arranged in close proximity to various components of the mobile computing device 200 such as a battery and/or battery connector within the mobile computing device 200.

In various implementations, the second internal antenna element 208 may be structured and arranged with a bent or folded configuration. For example, the second internal antenna element 208 may employ a paper-clip type design in which most of ground layer of the PCB 204 underneath the internal antenna element 208 is removed. In such implementations, the antenna pattern may be optimized and most of the radiating element at the lower frequency bands may be on the top of the antenna carrier and further away from the PCB 204. As such, the second internal antenna element 208 may achieve 50% minimum efficiency at the 850/1800/1900 or 900/1800/1900 MHz frequency bands with a reduced SAR value of 1.35 mW/g, which is lower than FCC limit of 1.6 mW/g.

The first internal antenna element 206 may be positioned at the top of the mobile computing device 200 and the second internal antenna element 208 may be positioned at the bottom of the mobile computing device 200 to allow enough spatial separation to provide sufficient isolation among all four (e.g., 850/1800/1900/2100 or 900/1800/1900/2100 MHz) frequency bands. In some embodiments, the first internal antenna element 206 and the second internal antenna element 208 may achieve maximum separation within the mobile computing device 200. For example, the first internal antenna element 206 may be integrated with the mobile computing device 200 such that an external surface of the first internal antenna element 206 is substantially even, aligned or flush with the top of the housing 202 and/or the top of the PCB 204. The second internal antenna element 208 may be integrated with the mobile computing device 200 such that an external surface of the second internal antenna element 208 is substantially even, aligned or flush with the bottom of the housing 202 and/or the bottom of the PCB 204.

As described above, the internal multi-band antenna architecture may comprise a split multi-band/single sub-band design having internal antenna elements 206, 208 which coexist to cover all four frequency bands with sufficient efficiency and SAR. The internal antenna architecture also may be used to implement a multi-band antenna solution for a mobile computing device 200 having a small form factor. The internal antenna architecture may allow devices (e.g., QWERTY keyboard products) to have smaller internal dimensions and smaller antenna area while maintaining excellent GSM and UMTS services and functionality, such as high quality audio and camera functionality in the back of the device.

While the mobile computing device 200 shown in FIG. 2 comprises an exemplary embodiment of an internal antenna architecture, it can be appreciated that the exact placement or location of the first internal antenna element 206 and the second internal antenna element 208 within the mobile computing device 200 may be performed in accordance with various performance and design constraints. For example, the efficiency of each antenna may depend upon a proper relationship between the size and shape of the antenna and the wavelength of the targeted frequency. The specific frequency range that the antenna is designed to cover may dictate the optimal size of an antenna. Therefore, the specific implementation of the first internal antenna element 206 and the second internal antenna element 208 may vary depending upon such factors as the target operating frequencies, power consumption requirements, battery life, a form factor of the mobile computing device, transceiver operations, signal quality, weight considerations of the mobile computing device, and so forth.

The internal antenna architecture having the first internal antenna element 206 and the second internal antenna element 208 may be tuned for operating at one or more frequency bands, or certain portions of a frequency band. Accordingly, the mobile computing device 200 may be compatible with multiple types of wireless data, multimedia, and/or cellular systems. In addition, the first internal antenna element 206 and/or the second internal antenna element 208 may be used to implement various spatial diversity techniques to improve communication of wireless signals across one or more frequency bands of wireless shared media.

In one or more embodiments, the mobile computing device 200 may be implemented as a dual-mode device capable of communication over multiple networks. For instance, the mobile computing device 200 may be capable of operating in a first mode and a second mode. An example of a first mode may include a UMTS mode for communicating over a UMTS network. An example of a second mode may include GSM mode for communicating over a GSM network. As such, the internal antenna elements 206, 208 may be tuned for operating across a set of frequency bands assigned to a GSM network and a UMTS network. It may be appreciated that the mobile computing device 200 may have other types of modes, networks and frequency bands as desired for a given implementation. The embodiments are not limited in this context.

In order to support dual-mode communications, the mobile computing device 200 may be implemented as a multi-band device capable of supporting multiple frequency bands for communication over the multiple networks. Table 1 provides various examples of uplink and downlink frequency sub-bands suitable for implementation by a multi-band device such as the mobile computing device 200.

TABLE 1

| Operating Band | Uplink (MHz) | Downlink (MHz) | Region | Common Name |
|---|---|---|---|---|
| I | 1920-1980 | 2110-2170 | EU/JP/APAC | UMTS-2100 |
| II | 1850-1910 | 1930-1990 | AM | PCS-1900 or UMTS-1900 |
| III | 1710-1785 | 1805-1880 | EU/JP/APAC | DCS-1800 or UMTS-1800 |
| V | 824-849 | 869-894 | AM | GSM-850 or UMTS-850 |
| VIII | 880-915 | 925-960 | EU/JP/APAC | GSM-900 or UMTS-900 |

As shown in Table 1, four frequency bands are used for GSM communication, including: (1) the 850 MHz frequency band (e.g., Operating Band V); (2) the 900 MHz frequency band (e.g., Operating Band VIII); (3) the 1800 MHz frequency band (e.g., Operating Band III); and (4) the 1900 MHz frequency band (e.g., Operating Band II), all of which are defined by the European Telecommunications Standards Institute (ETSI). UMTS communications may use various frequency bands, some of which may overlap GSM frequency bands depending on a given region. For example, the Operating Bands II, III, V and VIII can be used for GSM and/or UMTS networks depending on a given region. However, Operating Band I is exclusively reserved for UMTS networks.

In one or more embodiments, the mobile computing device 200 may be implemented as a multi-band device supporting multiple frequency bands as shown in Table 1. In some embodiments, for example, the mobile computing device 200 may be implemented as a multi-band 850/1800/1900/2100 MHz device configured to operate in the 850 MHz frequency band, the 1800 MHz frequency band, the 1900 MHz frequency band, and the 2100 MHz frequency band. In some embodiments, the mobile computing device 200 may be implemented as a multi-band 900/1800/1900/2100 MHz device configured to operate in the 900 MHz frequency band, the 1800 MHz frequency band, the 1900 MHz frequency band, and the 2100 MHz frequency band. The embodiments, however, are not limited in this context.

In various embodiments, the internal antenna elements 206, 208 may be more specifically tuned for operation within a given frequency band, such as for respective downlink frequency sub-bands and uplink frequency sub-bands for a given frequency band. For example, the first internal antenna element 206 may be arranged to operate in at least one downlink frequency sub-band of an upper frequency band from a set of frequency bands for communication in a first mode. A downlink frequency sub-band may comprise a portion of a given frequency band allocated for downlink communications from a base station to a mobile station for a given type of network. The second internal antenna 208 may be arranged to operate in an uplink frequency sub-band of the upper frequency band for communication in the first mode. An uplink frequency sub-band may comprise a portion of a given frequency band allocated for uplink operations from a mobile station to a base station for a given type of network. An example of a first mode may comprise a UMTS mode for operations with a UMTS network. An example of a second mode may comprise a GSM mode for operations with a GSM network.

Table 2 provides various examples of uplink and downlink frequency sub-bands for a UMTS network utilizing UMTS Frequency Division Duplexing (FDD). UMTS-FDD is a 3$^{rd}$ Generation Partnership Project (3GPP) standardized version of UMTS networks that uses a UMTS Terrestrial Radio Access (UTRA) air interface and FDD for duplexing operations.

TABLE 2

| Operating Band | Uplink (MHz) | Downlink (MHz) | Region | Common Name |
|---|---|---|---|---|
| I | 1920-1980 | 2110-2170 | EU/JP/APAC | UMTS-2100 |
| II | 1850-1910 | 1930-1990 | AM | PCS-1900 or UMTS-1900 |
| III | 1710-1785 | 180.5-1880 | EU/JP/APAC | DCS-1800 or UMTS-1800 |
| IV | 1710-1755 | 2110-2155 | AM | AWS or UMTS-1700/2100 |
| V | 824-849 | 869-894 | AM | GSM-850 or UMTS-850 |
| VI | 830-840 | 875-885 | JP | UMTS-800 |
| VII | 2500-2570 | 2620-2690 | EU | UMTS-2600 or IMT-E |
| VIII | 880-915 | 925-960 | EU/JP/APAC | GSM-900 or UMTS-900 |
| IX | 1749.9-1784.9 | 1844.9-1879.9 | JP | UMTS-1700 |

In one embodiment, for example, the first internal antenna element 206 may be arranged to operate in at least one downlink frequency sub-band of an upper frequency band from a set of frequency bands for communication in a first mode. An example of a first mode may include a UTMS mode for operations with a UTMS network. As indicated in Table 2, for example, the UMTS Operating Band I has an upper frequency band of 2100 MHz, and utilizes a downlink frequency sub-band of 2110-2170 MHz. In this case, the first internal antenna element 206 may be arranged to operate in at least one downlink frequency sub-band of 2110-2170 MHz of an upper frequency band 2100 MHz from a set of frequency bands 850/1800/1900/2100 MHz or 900/1800/1900/2100 MHz for communication in a UMTS mode. It may be appreciated that other upper frequency bands and downlink frequency sub-bands may be utilized for different implementations, such as those shown in Table 2, among others.

In one embodiment, for example, the second internal antenna 208 may be arranged to operate in an uplink frequency sub-band of the upper frequency band for communication in a first mode. As indicated in Table 2, for example, the UMTS Operating Band I has an upper frequency band of 2100 MHz, and utilizes an uplink frequency sub-band of 1920-1980 MHz. In this case, the second internal antenna element 208 may be arranged to operate in at least one uplink frequency sub-band of 1920-1980 MHz of an upper frequency band 2100 MHz from a set of frequency bands 850/1800/1900/2100 MHz or 900/1800/1900/2100 MHz for communication in a UMTS mode. It may be appreciated that other upper frequency bands and uplink frequency sub-bands may be utilized for different implementations, such as those shown in Table 2, among others.

In addition to operating in an uplink frequency sub-band of the upper frequency band, the second internal antenna element 208 may be arranged to operate in at least three lower frequency bands from the set of frequency bands for communication in a second mode. An example of a second mode may comprise a GSM mode for operations with a GSM network. As indicated in Table 1, for example, four frequency bands are used for GSM communication, including the 850 MHz frequency band, the 900 MHz frequency band, the 1800 MHz frequency band, and the 1900 MHz frequency band. In this case, the second internal antenna element 208 may be arranged to operate in at least three lower frequency bands 850/1800/1900 MHz or 900/1800/1900 MHz from the set of frequency bands 850/1800/1900/2100 MHz or 900/1800/1900/2100 MHz for communication in a GSM mode. The embodiments, however, are not limited in this context.

In various embodiments, the downlink frequency sub-band and the uplink frequency sub-band may comprise discontiguous frequency sub-bands. The downlink frequency sub-band and the uplink frequency sub-band are discontiguous in that they are designed to cover different parts of the RF spectrum without overlap. In other words, the sub-bands may be adjacent to one another but not necessarily adjoining to one another. Utilizing separate internal antenna elements 206, 208 for each of the respective downlink and uplink communications for a given network provides several technical advantages over conventional internal antenna architectures. For example, there is typically a guard band between a downlink frequency sub-band and an uplink frequency sub-band. In radio architectures, a guard band is an unused part of the radio spectrum between frequency bands for the purpose of preventing interference. It is typically a narrow frequency range used to separate two wider frequency ranges to ensure that both can transmit simultaneously without interfering each other. Guard bands may be used so that adjacent frequency bands on the same wireless shared media can avoid interference. As indicated in Table 2, for example, the UMTS Operating Band I has a frequency band of 2100 MHz, and utilizes a downlink frequency sub-band of 2110-2170 MHz, and an uplink frequency sub-band of 1920-1980 MHz. In this example, the guard band between the uplink and downlink frequency sub-bands is approximately 130 MHz. Utilizing separate internal antenna elements 206, 208 for each of the respective downlink and uplink communications for a UMTS network reduces or eliminates the need for the antenna elements 206, 208 to cover the 130 MHz guard band. This may reduce the geometries and antenna specifications needed to support UMTS operations, which may be particularly advantageous given the smaller form factors for the mobile computing device 200. Further, this may reduce the need for various components and circuit elements typically used to detect and filter the RF signals across a contiguous set of frequencies.

In one or more embodiments, the mobile computing device 200 may comprise a third internal antenna element 218 arranged to operate in at least one frequency band for communication in a third mode. The third mode may comprise, for example, a Global Positioning System (GPS) mode. As shown in FIG. 2, the mobile computing device 200 may comprise an additional or third internal antenna element 218 disposed on the housing 202 or the PCB 204. In one or more embodiments, the third internal antenna element 218 may comprise a single-band antenna element such as a separate Global Positioning System (GPS) antenna element. In such embodiments, the third internal antenna element 218 may be configured to operate in the 1575 MHz frequency band for GPS services. Accordingly, the mobile computing device 200 may be arranged to provide various position determining capabilities and/or location-based services (LBS). Examples of such services include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of services based on the current location of the mobile computing device 200.

In some embodiments, the third internal antenna element 218 may be structured and arranged in close proximity to various components (e.g., speaker, camera, battery) within the mobile computing device 200. Due to the small volume required by the first internal antenna element 206, there is sufficient space on the top of the mobile computing device 200 (e.g., on the top right) to implement the third internal antenna element 218 (e.g., GPS antenna element).

Figure 3A:
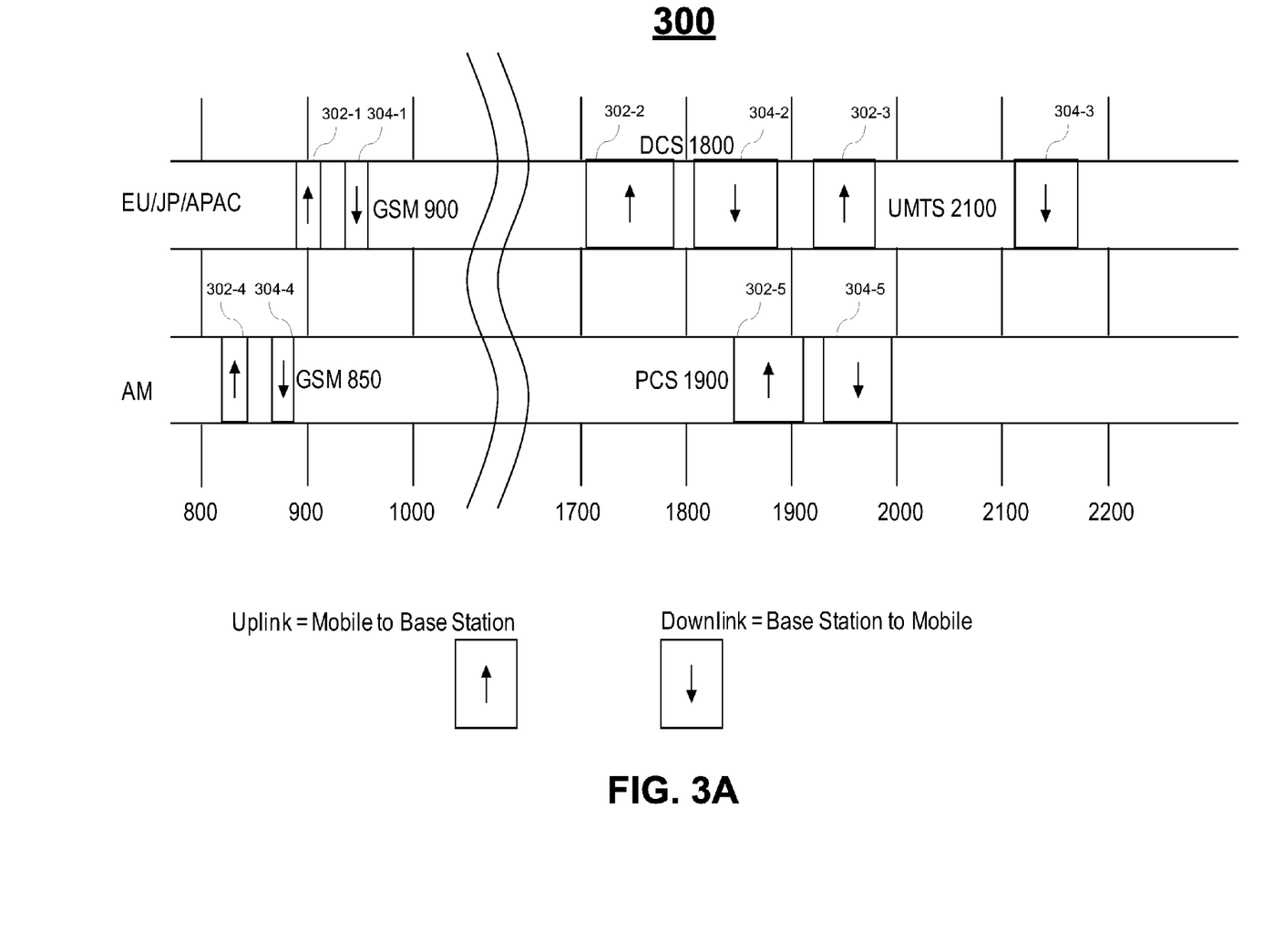
FIG. 3A illustrates one embodiment of a first spectrum diagram.

FIG. 3A illustrates a spectrum diagram 300. The spectrum diagram 300 indicates various uplink frequency sub-bands 302-1-a for different networks and different regions along the RF spectrum 800-2200 MHz. For instance, an uplink frequency sub-band 302-1 for a GSM network operating in Europe, Japan and the Asian Pacific regions may comprise 880-915 MHz, while an uplink frequency sub-band 302-3 for a UMTS network operating in the same regions may comprise 1920-1980 MHz. Spectrum diagram 300 also indicates various downlink frequency sub-bands 304-1-b for different networks and different regions along the RF spectrum 800-2200 MHz. For instance, a downlink frequency sub-band 304-1 for a GSM network operating in Europe, Japan and the Asian Pacific regions may comprise 925-960 MHz, while a downlink frequency sub-band 304-3 for a UMTS network operating in the same regions may comprise 2110-2170 MHz.

Figure 3B:
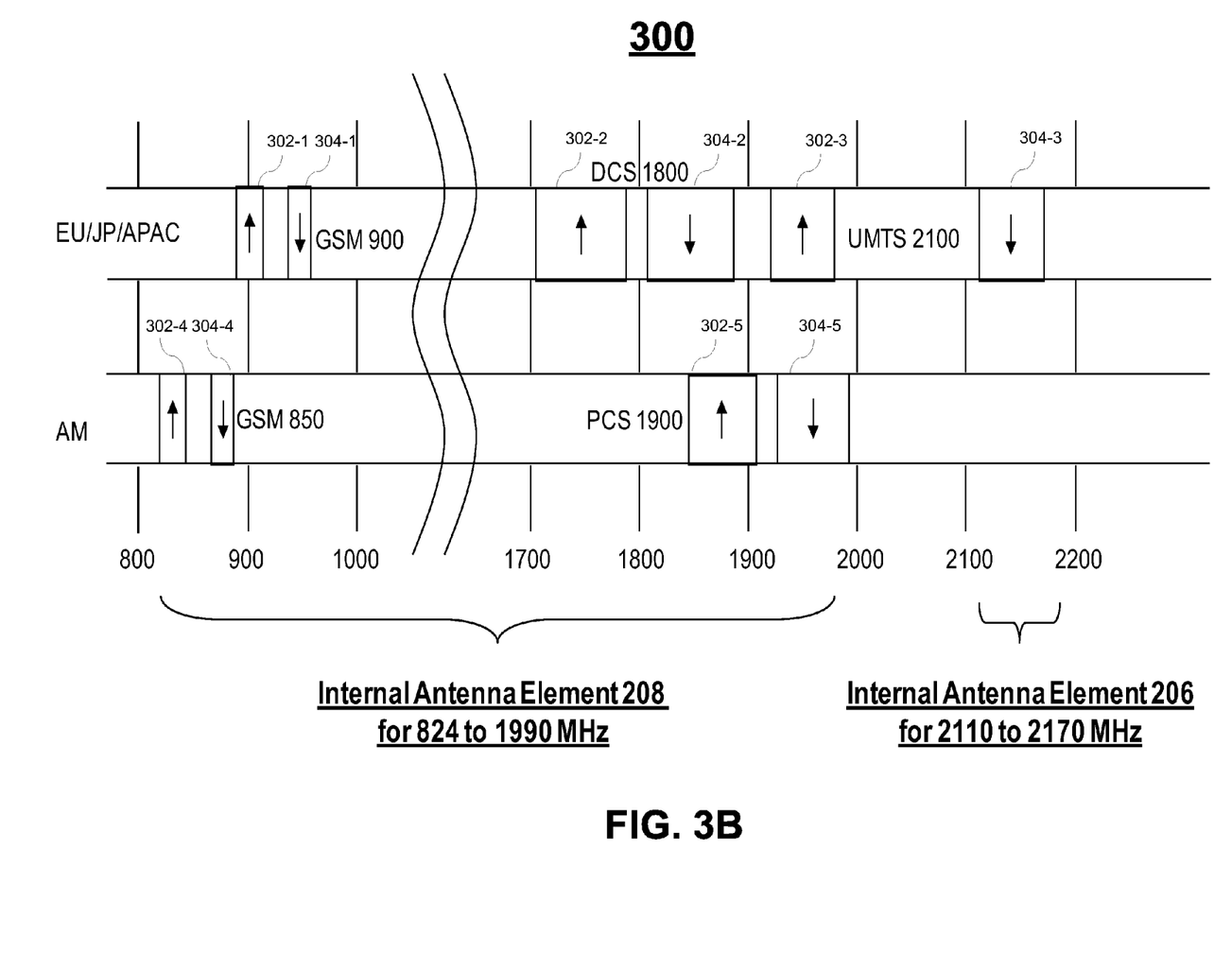
FIG. 3B illustrates one embodiment of a second spectrum diagram.

FIG. 3B further illustrates the spectrum diagram 300. As previously described, the mobile computing device 200 may be implemented as a multi-band device supporting multiple frequency bands. In some embodiments, for example, the mobile computing device 200 may be implemented as a multi-band 850/1800/1900/2100 MHz device configured to operate in the 850 MHz frequency band, the 1800 MHz frequency band, the 1900 MHz frequency band, and the 2100 MHz frequency band. In some embodiments, for example, the mobile computing device 200 may be implemented as a multi-band 900/1800/1900/2100 MHz device configured to operate in the 900 MHz frequency band, the 1800 MHz frequency band, the 1900 MHz frequency band, and the 2100 MHz frequency band. When operating in a UTMS mode, the first internal antenna element 206 may be used for the downlink frequency sub-band 304-3 of 2110-2170 MHz, and the second internal antenna element 208 may be used for the uplink frequency sub-band 302-3 of 1920-1980 MHz. When operating in a GSM mode, the second internal antenna element 208 may be used for both the uplink and downlink frequency sub-bands operating in the 850/1800/1900 MHz or 900/1800/1900 MHz frequency bands.

Figure 4:
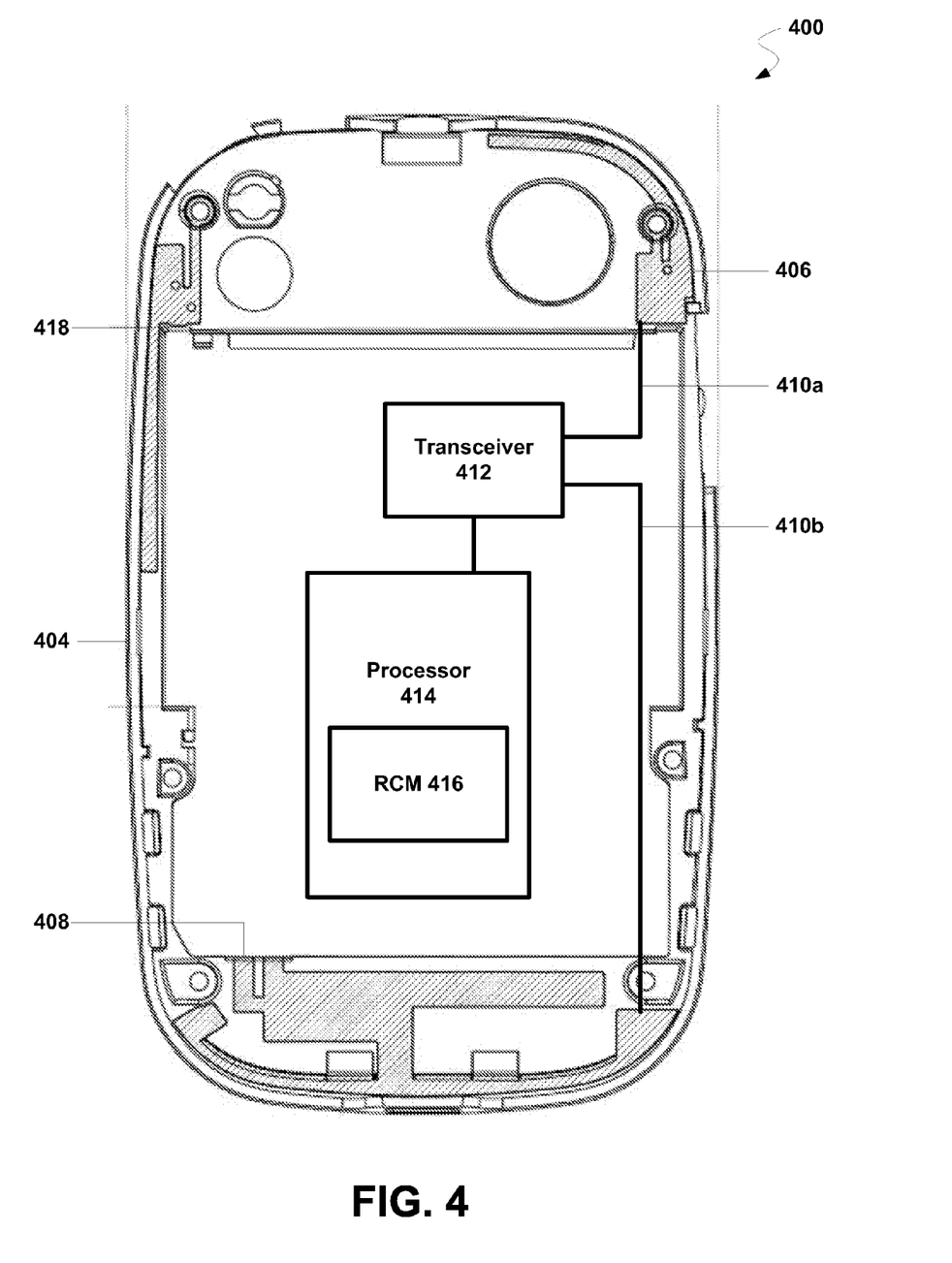
FIG. 4 illustrates one embodiment of an internal antenna design.

FIG. 4 illustrates a mobile computing device 400 having an internal antenna architecture in accordance with one or more embodiments. The mobile computing device 400 may be similar in structure and operation to the mobile computing device 200.

As shown in FIG. 4, the first internal antenna element 406 and the second internal antenna element 408 may be coupled to a transceiver 412 by RF connectors 410a, 410b. In one or more embodiments, the RF connectors 410a, 410b may comprise dual-mode RF connectors supporting communication by the mobile computing device 400 over both a GSM network and a UMTS network. Additionally or alternatively, the internal antenna elements 406, 408 may be coupled to each other by an RF connector similar to the RF connectors 410a, 410b. Examples for the RF connectors 410a, 410b may comprise any suitable medium for communicating antenna signals, including co-axial cable, metal traces, lines, buses, and other communications or signal media. The embodiments are not limited in this context.

In various embodiments, first internal antenna element 406 and the second internal antenna element 408 may be electrically connected through the RF connectors 410a, 410b to a transceiver module 412 operatively associated with a processor module 414. In order to increase power transfer, the transceiver module 412 may be interconnected to an antenna such that respective impedances are substantially matched or electrically tuned to compensate for undesired antenna impedance. In some cases, the transceiver module 412 may be implemented as part of a chip set associated with the processor module 414.

In various embodiments, the transceiver module 412 may comprise one or more transceivers or components arranged to communicate using different types of protocols, communication ranges, operating power requirements, RF bands or sub-bands, information types (e.g., voice or data), use scenarios, applications, and so forth. The transceiver module 412 generally may be implemented using one or more chips as desired for a given implementation. Although the transceiver module 412 may be shown as being separate from and external to the processor module 414 for purposes of illustration, it is worthy to note that in various embodiments some portion or the entire transceiver module 412 may be included on the same integrated circuit as the processor module 414.

The transceiver module 412 may comprise, for example, one or more cellular transceivers or components arranged to support communication over a cellular voice channel for a system such as a CDMA, GSM, and/or UMTS cellular system. The transceiver module 412 also may comprise one or more WWAN transceivers or components arranged to support data communication over a WWAN data channel in accordance with one or more WWAN protocols such as EVDO protocols, EVDV protocols, CDMA/1xRTT protocols, GSM/GPRS protocols, EDGE protocols, HSDPA protocols, and so forth. The transceiver module 412 also may comprise one or more transceivers or components arranged to support data communication over a WLAN data channel in accordance with one or more WLAN protocols such as IEEE 802.11a/b/g/n protocols, IEEE 802.16 protocols, IEEE 802.20 protocols, PAN protocols, Infrared protocols, Bluetooth protocols, EMI protocols including passive or active RFID protocols, and so forth. In some implementations, the transceiver module 412 may comprise a GPS transceiver to support position determination capabilities and/or location-based services.

In various embodiments, the processor module 414 may comprise one or more processors such as a host processor and/or a radio processor. In such embodiments, the host processor may be arranged to provide processing or computing resources for the mobile computing device 400. The radio processor may be responsible for performing various voice and data communications operations for the mobile computing device 400 such as transmitting and receiving voice and data information over one or more wireless communications channels. The host processor and the radio processor may communicate with each other using interfaces such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although some embodiments may comprise a dual-processor architecture, it is worthy to note that the mobile computing device 400 may comprise any suitable processor architecture and/or any suitable number of processors consistent with the described embodiments.

The host processor may be implemented as a host central processing unit (CPU) using any suitable processor or logic device, such as a as a general purpose processor. Although some embodiments may be described with the host processor implemented as a CPU or general purpose processor by way of example, it may be appreciated that the embodiments are not limited in this context. For example, the host processor may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

The host processor may be responsible for executing various software programs such as system programs and application programs to provide computing and processing operations for the mobile computing device 400. System programs generally may assist in the running of the mobile computing device 400 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 400 may utilize any suitable OS in accordance with the described embodiments such as a Palm webOS™, Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. In various implementations, the application programs may provide one or more graphical user interfaces (GUIs) to communicate information between the mobile computing device 400 and a user. Examples of application programs may include, without limitation, one or more messaging applications (e.g., telephone, voicemail, facsimile, e-mail, IM, SMS, MMS, video conferencing), web browser applications, personal information management (PIM) applications (e.g., contacts, calendar, scheduling, tasks), GPS applications, LBS applications, word processing applications, spreadsheet applications, database applications, media applications (e.g., video player, audio player, multimedia player, digital camera, video camera, media management), gaming applications, and so forth.

As mentioned above, the radio processor may perform voice and/or data communication operations for the mobile computing device 400. For example, the radio processor may be arranged to communicate voice information and/or data information over one or more assigned frequency bands of a wireless communication channel. In various embodiments, the radio processor may be implemented as a communications processor using any suitable processor or logic device, such as a modem processor or baseband processor. In such embodiments, the radio processor may perform analog and/or digital baseband operations for the mobile computing device 400. For example, the radio processor may perform digital-to-analog conversion (DAC), analog-to-digital conversion (ADC), modulation, demodulation, encoding, decoding, encryption, decryption, and so forth. Although the radio processor may be implemented as a modem processor or baseband processor by way of example, the embodiments are not limited in this context. For example, the radio processor may comprise, or be implemented as, a digital signal processor (DSP), media access control (MAC) processor, or any other type of communications processor in accordance with the described embodiments.

In one embodiment, the processor module 414 may implement a radio control module 416 that when executed by the processor module 414 is operative to switch the transceiver 412 between operating modes, such as from a first mode to a second mode. For instance, the radio control module 416 may switch the transceiver 412 from a UTMS mode to a GSM mode, and vice-versa. The radio control module 416 may also implement other radio control operations to control the transceiver 412 and make efficient use of the internal antenna elements 406, 408 and 418.

Figure 5:
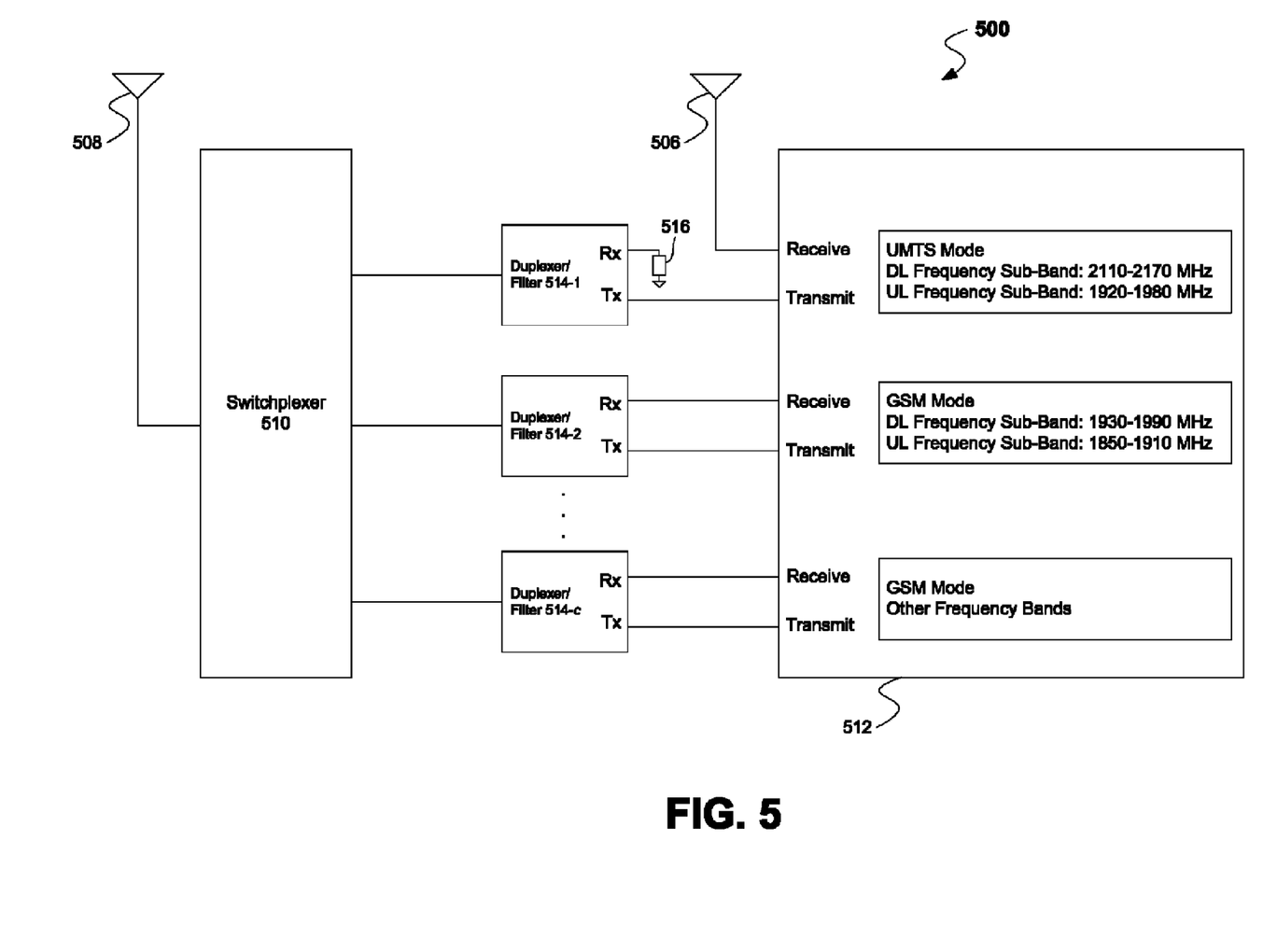
FIG. 5 illustrates one embodiment of a communications apparatus.

FIG. 5 illustrates an apparatus 500. The apparatus 500 provides a more detailed illustration of an implementation for an internal antenna architecture for a dual-mode GSM/UTMS multi-band device, such as the mobile computing devices 200, 400.

In the illustrated embodiment shown in FIG. 5, the apparatus 500 comprises internal antenna elements 506, 508 which are similar in structure and operation to the corresponding internal antenna elements 206, 208 described with reference to FIG. 2. Although a single antenna element is shown for each of the internal antenna elements 506, 508, it may be appreciated that additional antenna elements may also be implemented to form antenna arrays for the internal antenna elements 506, 508. This may be desirable to implement spatial diversity techniques, for example. The embodiments are not limited in this context.

The first internal antenna element 506 is connected to a switchplexer 510. The switchplexer 510 may switch antenna signals from the second internal antenna element 508 to the transceiver 512 via the appropriate duplexers/filters **514-1-*c*.

The second internal antenna element 508 is connected to a multi-band transceiver 512. The multi-band transceiver 512 is similar in structure and operation to the corresponding transceiver 412 described with reference to FIG. 4. Although a single transceiver 512 is shown in the apparatus 500, it may be appreciated that additional transceivers 512 designed for different frequency bands may be implemented as well. The embodiments are not limited in this context.

A set of duplexers/filters **514-1-*c* may be located between the switchplexer 510 and the transceiver 512. Each of the duplexers/filters 514-1-*c* combines transmit and receive signals from the transceiver 512 into a common channel for the switchplexer 510. The duplexers/filters 514-1-*c* isolate the receiver from the transmitter while permitting them to share a common antenna, such as the second internal antenna element 508. The duplexers/filters 514-1-*c* are designed for operation in a particular frequency band used by the receiver and transmitter, and are configured to handle the output power of the transmitter. The duplexers/filters 514-1-*c*** are also arranged to filter transmitter noise occurring at the receive frequency, and provide sufficient isolation to prevent receiver desensitization.

As shown, the transceiver 512 may be a multi-band transceiver capable of transmitting and receiving in different modes and frequency bands. The different modes may comprise a GSM mode and a UTMS mode. The frequency bands may comprise different sets of frequency bands allocated to GSM and UTMS networks, such as a first frequency set of 850/1800/1900/2100 MHz or a second frequency set of 900/1800/1900/2100 MHz. The modes and sets of frequency bands are used by way of example and not limitation. The embodiments are not limited to these examples.

When transmitting in a UTMS mode, the transceiver 512 may send transmit signals for the uplink frequency sub-band 302-3 (e.g., 1920-1980 MHz) through the duplexer/filter 514-1 to the switchplexer 510 for transmission by the second internal antenna element 508. On the receive channel, however, the duplexer/filter 514-1 isolates the transceiver 512 from signals received by the second internal antenna element 508 via a terminating element 516. For instance, the duplexer/filter 514-1 may have the terminating element 516 coupled to a receive output of the duplexer/filter 514-1, and the first internal antenna element 506 is coupled to a receive input of the transceiver 512. When receiving in a UTMS mode, the transceiver 512 receives signals from the first internal antenna element 506 for the downlink frequency sub-band 304-3 (e.g., 2110-2170 MHz).

When transmitting in a GSM mode, the transceiver 512 may send transmit signals for the uplink frequency sub-band 302-5 (e.g., 1850-1910 MHz) through the duplexer/filter 514-2 to the switchplexer 510 for transmission by the second internal antenna element 508. When receiving in a GSM mode, the transceiver 512 receives signals from the second internal antenna element 508 for the downlink frequency sub-band 304-5 (e.g., 1930-1990 MHz). Various other duplexers/filters 514-3-c may be used for the other GSM frequency bands in a similar manner.

Various embodiments are directed to an antenna architecture that may potentially improve the performance of a mobile computing device by improving one or more of characteristics, such as a size, shape, form factor, power consumption, battery life, transceiver operations, signal quality, weight, and other characteristics of the mobile computing device. For example, various embodiments may provide improved performance while complying with regulatory requirements (e.g., SAR limit) for device operation. In various implementations, the described embodiments may provide flexibility for low-profile, small and compact device designs. Accordingly, a user may realize enhanced products and services.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
 a housing to encapsulate components of the mobile computing device;
 a first internal antenna element disposed on the housing arranged to operate in at least one downlink frequency sub-band of an upper frequency band from a set of frequency bands for communication in a first mode;

a second internal antenna element disposed on the housing arranged to operate in an uplink frequency sub-band of the upper frequency band for communication in the first mode;

a transceiver to couple to the first internal antenna element;

a switchplexer to couple to the second internal antenna element; and at least one duplexer/filter to couple to the transceiver and the switchplexer.

2. The mobile computing device of claim 1, the second internal antenna element arranged to operate in at least three lower frequency bands from the set of frequency bands for communication in a second mode.

3. The mobile computing device of claim 1, the first mode comprising a Universal Mobile Telephone System (UMTS) mode using the downlink frequency sub-band of the upper frequency band to receive radio-frequency signals, and the uplink frequency sub-band of the upper frequency band to transmit radio-frequency signals.

4. The mobile computing device of claim 1, the at least one downlink frequency sub-band of the upper frequency band comprising the 2100 MHz frequency band.

5. The mobile computing device of claim 2, the second mode comprising a Global System for Mobile Communications (GSM) mode using the at least three lower frequency bands.

6. The mobile computing device of claim 2, the three lower frequency bands comprising the 850 MHz frequency band, the 1800 MHz frequency band, and the 1900 MHz frequency band.

7. The mobile computing device of claim 2, the three lower frequency bands comprising the 900 MHz frequency band, the 1800 MHz frequency band, and the 1900 MHz frequency band.

8. The mobile computing device of claim 2, the downlink frequency sub-band and the uplink frequency sub-band comprising discontiguous frequency sub-bands.

9. The mobile computing device of claim 1, the first internal antenna element positioned substantially near a top of the housing.

10. The mobile computing device of claim 1, the second internal antenna element positioned substantially near a bottom of the housing.

11. The mobile computing device of claim 1, the first internal antenna element comprising a planar inverted F-antenna.

12. The mobile computing device of claim 1, the second internal antenna element comprising a paper-clip antenna.

13. The mobile computing device of claim 1, further comprising a third antenna element disposed on the housing arranged to operate in at least one frequency band for communication in a third mode.

14. The mobile computing device of claim 13, the third mode comprising a Global Positioning System (GPS) mode.

15. The mobile computing device of claim 1, the at least one duplexer/filter having a terminating element to couple to a receive output of the at least one duplexer/filter, and the first internal antenna element to couple to a receive input of the transceiver.

16. A mobile computing device, comprising:

a first internal antenna element configured to operate in a downlink frequency sub-band of an upper frequency band for communication in a first mode;

a second internal antenna element configured to operate in an uplink frequency sub-band of the upper frequency band for communication in the first mode;

a transceiver to couple to the first internal antenna element;

a switchplexer to couple to the second internal antenna element; and at least one duplexer/filter to couple to the transceiver and the switchplexer.

17. The mobile computing device of claim 16, the second internal antenna element arranged to operate in at least three lower frequency bands from the set of frequency bands for communication in a second mode.

18. The mobile computing device of claim 16, the first mode comprising a Universal Mobile Telephone System (UMTS) mode using the downlink frequency sub-band of the upper frequency band to receive radio-frequency signals, and the uplink frequency sub-band of the upper frequency band to transmit radio-frequency signals.

19. The mobile computing device of claim 17, the second mode comprising a Global System for Mobile Communications (GSM) mode using the at least three lower frequency bands.

20. The mobile computing device of claim 16, the at least one duplexer/filter having a terminating element to couple to a receive output of the at least one duplexer/filter, and the first internal antenna element to couple to a receive input of the transceiver.

21. The mobile computing device of claim 16, comprising a processor to couple to the transceiver.

22. The mobile computing device of claim 21, comprising a radio control module that when executed by the processor is operative to switch the transceiver from the first mode to the second mode.

* * * * *